United States Patent [19]

Pitts et al.

[11] Patent Number: 4,650,360

[45] Date of Patent: Mar. 17, 1987

[54] ANTISTATIC MARKING

[75] Inventors: Warren R. Pitts, Needham; Lewis H. Johnson, Mansfield; Steven M. Levin, Brookline, all of Mass.

[73] Assignee: Dennison Manufacturing Company, Framingham, Mass.

[21] Appl. No.: 655,278

[22] Filed: Sep. 27, 1984

[51] Int. Cl.⁴ .............................................. B43K 8/02
[52] U.S. Cl. ..................... 401/198; 401/196; 252/500; 252/502; 252/510; 252/511; 264/104; 264/105; 361/212; 361/214
[58] Field of Search ................. 401/198, 199, 196; 361/212, 214; 307/149; 523/174, 181; 252/500, 502, 510, 511; 400/235; 264/104, 105

[56] References Cited

U.S. PATENT DOCUMENTS 3,088,160  9/1961  Cline .................................. 401/198
3,916,003 10/1975  Sazuki et al. ....................... 260/404
4,203,769  5/1980  Guestaux ............................ 430/631
4,451,166  5/1984  Frechette et al. ................... 400/208
4,500,939  2/1985  Gueret ................................ 361/212

OTHER PUBLICATIONS

Deanin, "Polymer Struct. Prop. and App.", Cahners Books, Boston, 1972, (Scientific Library).

Primary Examiner—Richard J. Apley
Assistant Examiner—Gregory Beaucage
Attorney, Agent, or Firm—George E. Kersey

[57] ABSTRACT

A marking implement in which an antistatic material is incorporated in the housing of the implement. The antistatic material is a nonionic fatty acid ester and the housing is of plastic. The antistatic material effects a significant reduction in surface resistivity of the polyethylene.

10 Claims, 2 Drawing Figures

Negligible Dust

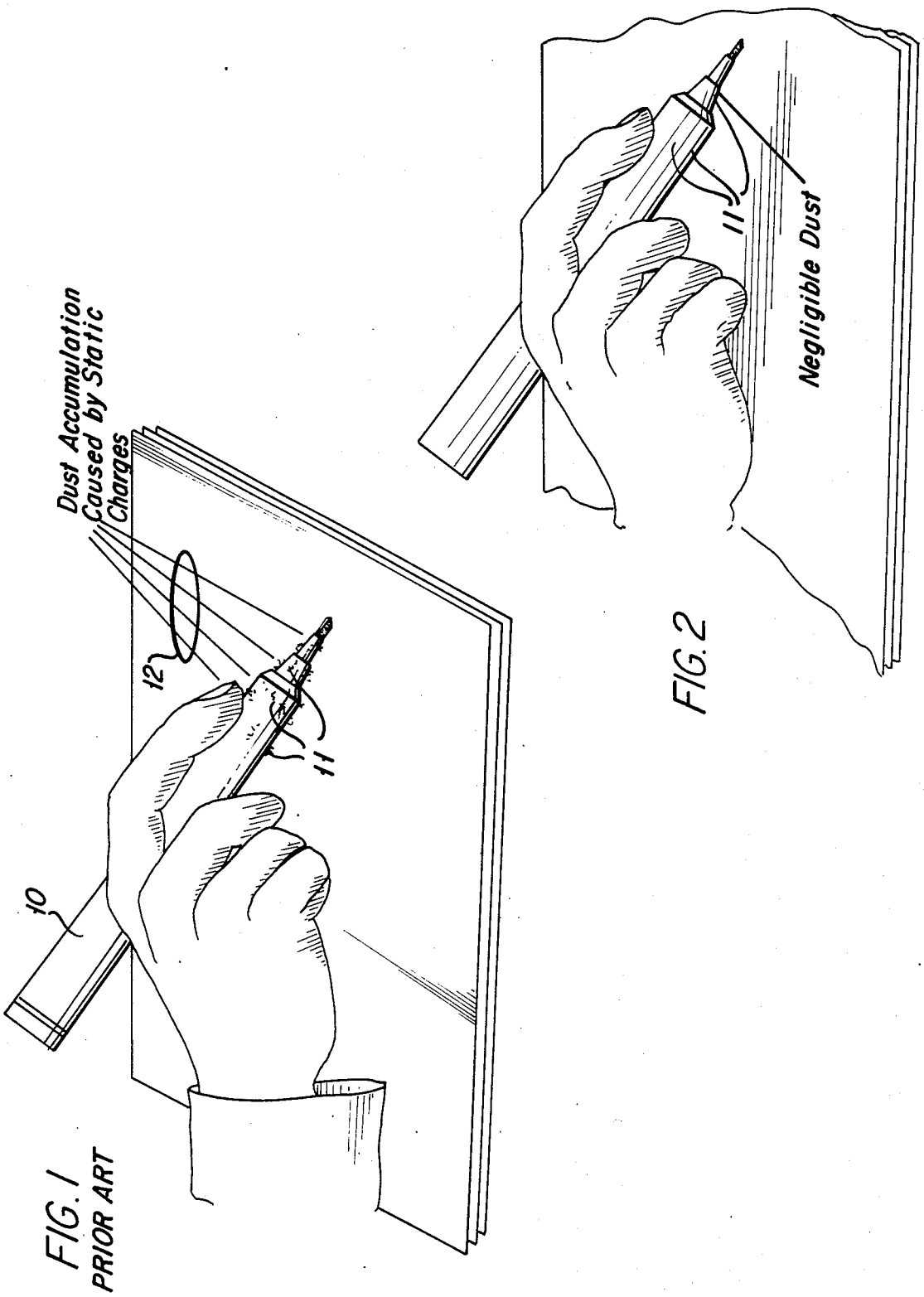

ANTISTATIC MARKING

BACKGROUND OF THE INVENTION

This invention relates to implements, commonly known as "markers", that are commonly employed in the marking of media such as paper, and more particularly to the marking of media with the avoidance of adverse static electricity effects.

In the use of marking implements, particularly with data processing equipment, there is an inevitable accumulation of static electricity. The accumulation of static charge can become so intense as to damage the printed circuitry and other constituents of the processing equipment.

Accordingly, it is an object of the invention to facilitate the use of marking implements in conjunction with processing equipment. A related object is to mitigate the adverse effects of static charge on marking implements.

SUMMARY OF THE INVENTION

In accomplishing the foregoing and related objects, the invention provides a marking implement which contains a marking medium and an applicator such as a nib. The marking medium is included within a housing that is provided with antistatic characteristics.

In accordance with one aspect of the invention, the housing, and any accompanying cap, include an antistatic material in the form of a nonionic fatty acid ester. The incorporation of such material into a marker enhances its utility in connection with magnetic media usage by avoiding triboelectric effects. Such effects would otherwise cause an undesirable accumulation of debris and possibly interfere with the magnetic media by causing the undesired loss of information or an alteration in recorded data.

In accordance with another aspect of the invention, the nonionic fatty acid ester is present in the housing and/or cap to the extent of about between 0.2 and 0.5 part by weight per hundred. A suitable material for the housing is polypropylene, and the surface resistivity of the polypropylene is decreased by the antistatic material from about $10^{15}$ ohms per square to less than $10^{12}$ ohms per square.

In accordance with a further aspect of the invention, the effectiveness of the antistatic material in mitigating the accumulation of static charge is increased by the inclusion of a minor amount of carbon black or other conductive colorant in the housing. The amount of such colorant is typically present to the extent of one part per hundred and acts in combination with the antistatic material that is provided by the invention.

BRIEF DESCRIPTION OF THE DRAWINGS

Other aspects of the invention will become apparent after considering several illustrative embodiments in which:

FIG. 1 is a sketch illustrating the undesired accumulation of debris on the housing of a conventional marker; and FIG. 2 is an illustration of the way in which the invention avoids the accumulation of undesired static charge.

DETAILED DESCRIPTION

With reference to the drawings, FIG. 1 shows an illustrative marking implement 10 which carries illustrative static charges 11. The charges 11 may be positive or negative depending upon the triboelectric member with which they were engaged.

As a result of the charges 11, undesired debris 12 is attracted to the housing. The debris is an undesired residue that not only soils the hands of the user but also can interfere with recordkeeping as, for example in the case of floppy disks where dust particles can have an adverse effect on the information stored by the disk. In addition, the static charges themselves can produce a static discharge to data processing equipment and the like and interfere with the functioning of the equipment.

The invention mitigates the foregoing problem by incorporating into the housing and the cap an antistatic material.

As illustrated in FIG. 2, the antistatic material is hydrophyllic. i.e. it tends to absorb moisture. By doing so, it provides a conductive path for dispersal or distribution of the charges 11, which are represented in FIG. 2 as widely distributed charges 11'.

A suitable antistatic material for the practice of the invention is a nonionic fatty acid ester. A particularly suitable fatty acid ester is a polyol stearate which is derived by the reaction of stearic acid (octadecanoic acid) with a polyol, i.e. an alcohol containing at least two hydroxyl groups. A suitable ester may also be derived by the reaction of stearic acid with a monoalcohol but this is less suitable. In addition, other common fatty acids in the range from decanoic to dodecanoic with polyols or monoalcohols may be suitable.

While various aspects of the invention have been set forth by the drawings and the specification, it is to be understood that the foregoing detailed description is for illustration only and that various changes in parts, as well as the substitution of equivalent constituents for those shown and described, may be made without departing from the spirit and scope of the invention as set forth in the appended claims.

We claim:

1. A marking implement comprising a polymeric housing containing a marking instrument wherein said instrument comrises a nib connection to a fluid marking medium and wherein an antistatic additive is incorporated in said polymeric housing, said additive comprising a nonionic fatty acid ester.

2. A marking implement in accordance with claim 1 wherein the fatty acid ester comprises between about 0.2 and 0.5 part by weight per hundred.

3. A marking implement in accordance with claim 2 wherein the housing is of polypropylene.

4. A marking implement in accordance with claim 3 wherein the antistatic material reduces the surface resistivity of said polypropylene from about $10^{15}$ ohms to less than $10^{12}$ ohms.

5. A marking implement in accordance with claim 4 wherein said housing contains a semiconductive colorant which coacts with said antistatic material.

6. A marking implement in accordance with claim 5 wherein the semiconductive material is about one part per hundred of said housing.

7. A marking implement in accordance with claim 6 wherein the colorant is carbon black.

8. A marking implement in accordance with claim 1 wherein the nonionic fatty acid ester is hydrophyllic.

9. A marking implement in accordance with claim 8 wherein the hydrophyllic fatty acid ester is a polyol stearate.

10. A marking implement in accordance with claim 9 wherein the polyol stearate is a polyalkyl glycol.

* * * * *